United States Patent
Czajkowski

[11] Patent Number: 6,158,299
[45] Date of Patent: Dec. 12, 2000

[54] PEDAL ASSEMBLY FOR ELECTRONIC THROTTLE CONTROL WITH HYSTERESIS-GENERATING STRUCTURE

[75] Inventor: Julian Czajkowski, Rugby, United Kingdom

[73] Assignee: Teleflex Incorporated, Plymouth Meeting, Pa.

[21] Appl. No.: 09/328,099

[22] Filed: Jun. 8, 1999

Related U.S. Application Data

[60] Provisional application No. 60/088,639, Jun. 9, 1998.

[51] Int. Cl.[7] .................................................. G05G 1/14
[52] U.S. Cl. ............................ 74/513; 180/335; 123/399
[58] Field of Search ............................ 74/514, 513, 512, 74/560; 180/335; 123/399; 267/155

[56] References Cited

U.S. PATENT DOCUMENTS

| | | | |
|---|---|---|---|
| Re. 34,302 | 7/1993 | Imoehl | 123/399 |
| Re. 34,574 | 4/1994 | Imoehl | 123/399 |
| 4,582,653 | 4/1986 | Blanchard et al. | 74/513 X |
| 4,869,220 | 9/1989 | Imoehl | 123/399 |
| 4,907,468 | 3/1990 | Hagiwara et al. | 74/512 |
| 4,915,075 | 4/1990 | Brown | 123/399 |
| 4,944,269 | 7/1990 | Imoehl | 123/399 |
| 4,958,607 | 9/1990 | Lundberg | 123/399 |
| 5,233,882 | 8/1993 | Byram et al. | 74/514 |
| 5,241,936 | 9/1993 | Byler et al. | 123/399 |
| 5,385,068 | 1/1995 | White et al. | 74/513 X |
| 5,396,870 | 3/1995 | Beale | 123/399 |
| 5,408,899 | 4/1995 | Stewart | 74/513 |
| 5,529,296 | 6/1996 | Kato et al. | 74/513 X |
| 5,697,260 | 12/1997 | Rixon et al. | 74/514 |
| 5,819,593 | 10/1998 | Rixon et al. | 74/514 |

*Primary Examiner*—Charles A. Marmor
*Assistant Examiner*—Ankur Parekh
*Attorney, Agent, or Firm*—Howard & Howard

[57] ABSTRACT

A pedal assembly includes a housing (16) and a pedal arm (14) pivotally connected to the housing (16) with a first end supporting a pedal pad (12) and a second end forming a pedal pivot arm (26). The pedal pivot arm (26) has at least one cam lobe (38) extending therefrom and the housing (16) has a cylindrical collar portion (30) recessed in the housing (16) for receiving and retaining at least one coil spring (24). The interaction of the spring (24) between the pedal pivot arm (26) and the collar portion (30) generates a hysteresis effect. The collar portion (30) has a notch (32) extending through the side wall of the housing (16). The coil spring (24) has a first distal end (34) seated in the notch (32) and a second distal end (36) that is in bias contact with the cam lobe (38). The coil spring (24) is forced into frictional contact with the side wall of the collar portion (30) when the pedal arm (14) is pivoted from a rest position to an operative position to reduce the spring force of the coil spring (24) on the pedal arm (14).

20 Claims, 4 Drawing Sheets

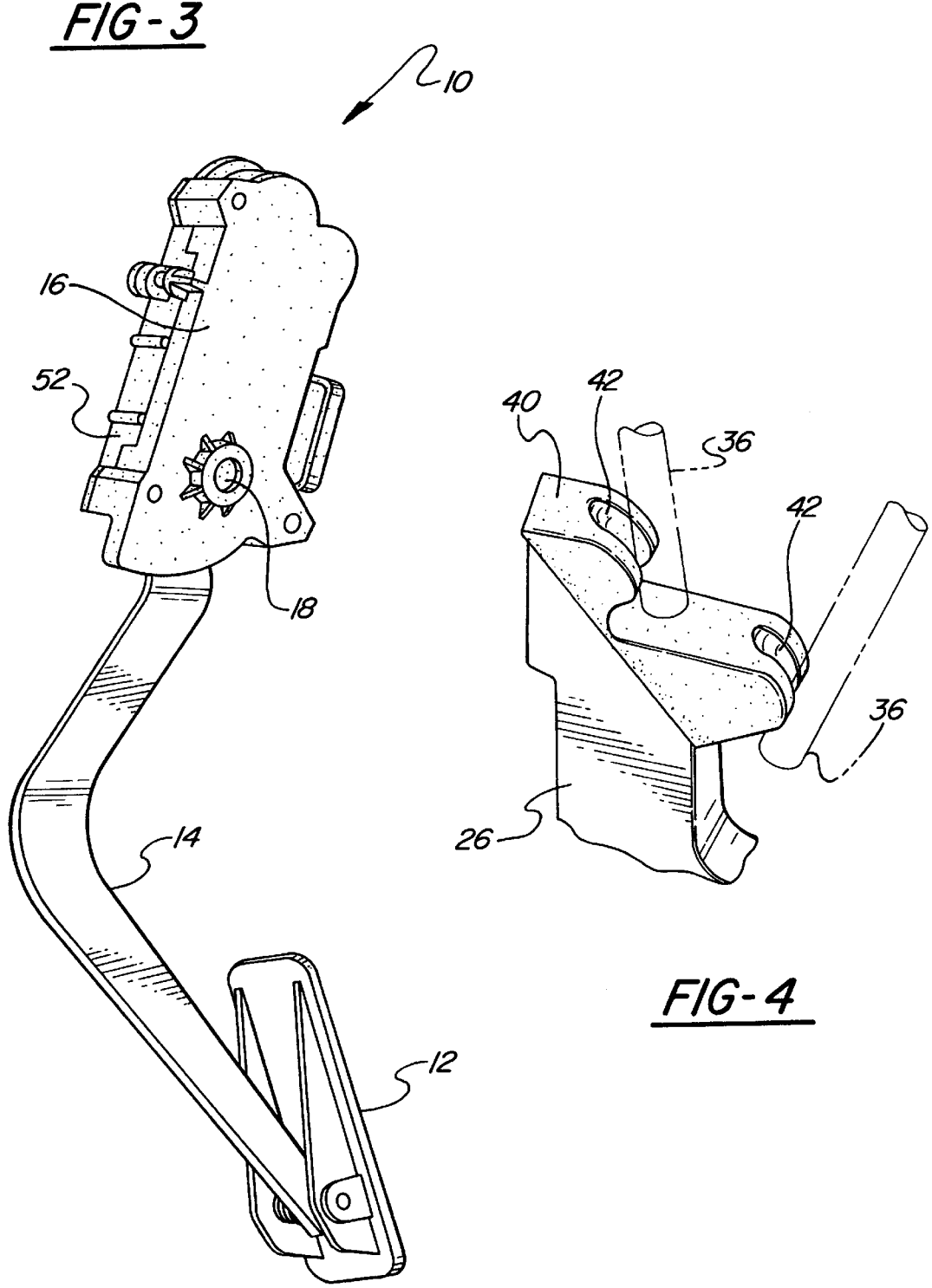

PEDAL ASSEMBLY FOR ELECTRONIC THROTTLE CONTROL WITH HYSTERESIS-GENERATING STRUCTURE

RELATED APPLICATION

This application claims priority to provisional application Ser. No. 60/088,639 filed on Jun. 9, 1998.

TECHNICAL FIELD

The subject invention relates generally to electronic throttle control device for a vehicle pedal assembly. Specifically, the electronic throttle control includes a resilient member interacting between the housing and a pedal portion to generate a hysteresis effect that reduces the amount of force that has to be applied to a pedal pad to maintain the vehicle at a constant speed.

BACKGROUND OF THE INVENTION

The invention relates to foot pedal devices for controlling engines without the need for a direct mechanical connection between the pedals and the engines. The invention is particularly directed to providing a drive-by-wire system, i.e., driving by electrical or electronic means, rather than by mechanical links.

In the prior art, accelerator pedals are used to mechanically control a vehicle engine and usually include a pedal mounted to a vehicle body with a series of links and levers, or Bowden cables, connecting the pedal to the carburetor, fuel injector, controller, or other similar device. These linkages must be designed to withstand and accommodate engine movements relative to the vehicle frame, as well as to provide accurate control despite such movements. In addition, packaging space must be provided for the linkages to function properly. The space available for routing the mechanical control links, rods, and cables is limited. When electrical sensors are used to monitor the position of the pedal, connection to the carburetor or other engine device can be accomplished with electrical wiring, which is more easily routed through the vehicle.

In drive-by-wire applications, it is important that the pedal system provide the customary feel and performance of a mechanical linkage. The pedals must function responsively to driver input and must provide non-fatiguing resistance. Drivers are accustomed to applying and releasing pressure on a pedal arrangement and become accustomed to the resistance to application of force to the pedal as well as to the rate of withdrawal as the applied pressure is relaxed. With the present invention, the customary feel during the application of force to increase speed and while maintaining speed, as well as the familiar deceleration movement of the pedal can be duplicated in a wire type control.

Typically, the pedal pressure required when advancing the accelerator pedal is greater than that required to maintain a fixed position. This difference is often referred to as a hysteresis effect. This effect is important in maintaining the accelerator pedal in position while driving at a relatively constant speed, and it must also be considered in achieving a desired deceleration time. The pressure which must be applied in accelerating is easily borne but if the back pressure of an accelerator spring produced the same effect during the time it was required to retain or maintain speed it would soon become uncomfortable for the driver to maintain a relatively constant speed. The hysteresis effect provides relief. It lessens the load required to maintain a setting of the accelerator yet there is still force to cause reverse pedal action when the applied pressure is removed.

The hysteresis effect is also important for eliminating undesirable accelerations and decelerations as the vehicle is driven over a bumpy road. Vehicles with manual transmissions do not typically include an accelerator pedal with a hysteresis effect. When the vehicle is driven over a bumpy road, the driver's foot follows the terrain causing the vehicle to accelerate and decelerate, which is undesirable. Thus, hysteresis is needed to provide stability to the vehicle over rough terrain.

Wire type throttle control for vehicle engines with hysteresis generating mechanisms are known. One such example is shown in U.S. Pat. No. 5,408,899. Often these hysteresis generating mechanisms are complex, include a significant number of parts, and are difficult to assemble. The present invention provides an electronic throttle control with an improved hysteresis generating mechanism. The hysteresis generating mechanism is simplified, requires fewer components, and is easier to maintain and assemble than known mechanisms.

SUMMARY OF THE INVENTION AND ADVANTAGES

A pedal assembly includes a housing and a pedal arm pivotally connected to the housing. A hysteresis effect is achieved by using a resilient member that interacts between the pedal arm and the housing. The resilient member is forced into frictional contact with a portion of the housing when the pedal arm is pivoted from a rest position to an operative position to reduce the spring force of the resilient member on the pedal arm.

In the preferred embodiment, the pedal assembly includes a housing and a pedal arm pivotally connected to the housing with a first end supporting a pedal pad and a second end forming a pedal pivot arm. The pedal pivot arm has at least one cam lobe extending therefrom and the housing has a cylindrical collar portion recessed in the housing for receiving and retaining a coil spring. The collar portion has a notch extending through the side wall of the housing. The coil spring has a first distal end seated in the notch and a second distal end that is in bias contact with the cam lobe. The coil spring is forced into frictional contact with the side wall of the collar portion when the pedal arm is pivoted from a rest position to an operative position to reduce the spring force of the coil spring on the pedal arm.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of an alternative embodiment of the subject invention;

FIG. 4 is a partially broken perspective view of the interference between the hysteresis springs and the cam lobes of the pedal arm;

DETAILED DESCRIPTION OF THE PREFERRED EMBODIMENT

Figure 2:
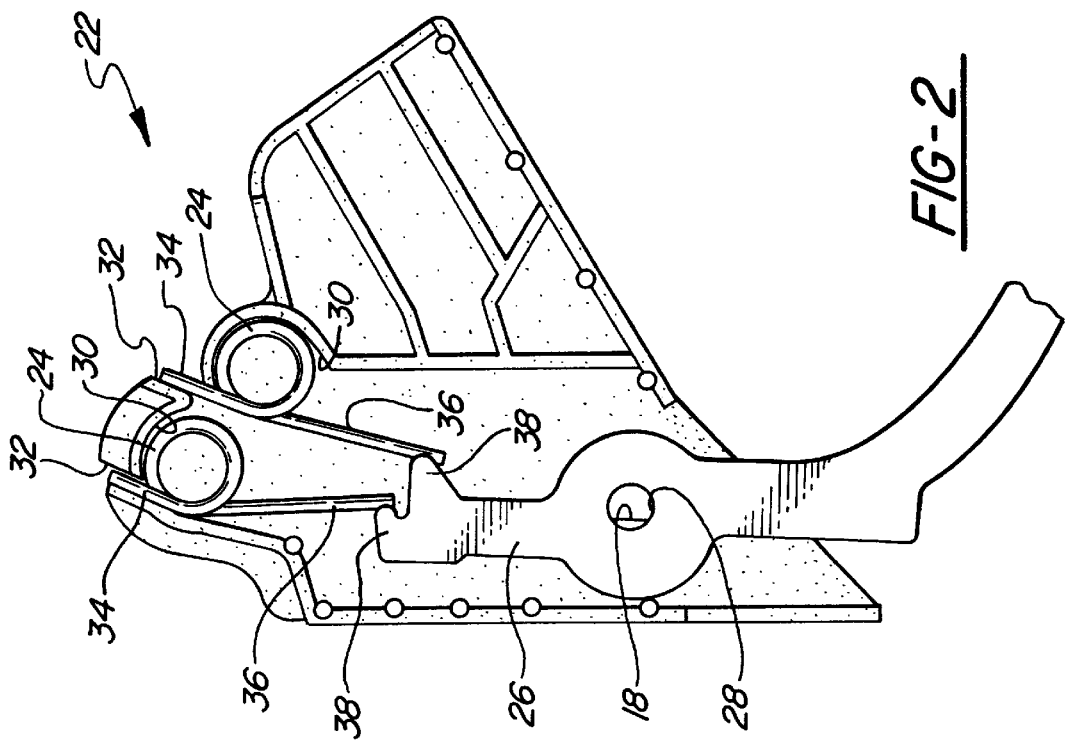
FIG. 2 is a partially broken top view of the pedal housing with the cover removed showing the interference of the hysteresis springs with the pedal arm.

The subject invention as shown in FIGS. 1–8 relates to an electronic throttle control accelerator pedal system including a pair of springs interacting between a pedal housing and a pedal pivot arm to achieve a hysteresis effect when an accelerator pedal is pressed and held down to achieve a desired speed. Commonly, accelerator pedals actuate the throttle body of the vehicle through interconnection of a push-pull type cable. The friction between the cable core element and the surrounding conduit creates hysteresis in the system to reduce the force necessary to retain the pedal in the desired actuated position. The initial force required to press an accelerator pedal to a certain position would therefore be higher than the force required to maintain the pedal in that position, which is known as hysteresis. This hysteresis effect is important because it prevents the driver's foot from becoming fatigued as he or she holds the accelerator pedal down in a constant position. The hysteresis effect is also important for eliminating undesirable accelerations and decelerations as the vehicle is driven over a bumpy road. However, when it is desirous to utilize a non-cable actuated accelerator pedal assembly, such as an electronic throttle control accelerator pedal, an alternative means of providing this hysteresis effect in the pedal must be utilized in the absence of the cable assembly. The subject invention accomplishes the hysteresis effect by using a pair of springs which interact with the pedal pivot arm and pedal housing.

Referring to the FIGURES, wherein like numerals indicate like or corresponding parts throughout the several views, an electronic throttle control (ETC) accelerator pedal assembly is generally shown at 10. The assembly 10 includes an accelerator pedal pad 12, a pedal arm 14, and a housing 16. The accelerator pedal pad 12 is connected to one end of the pedal arm 14 and the other end of the pedal arm 14 is pivotally attached to the housing 16 by a pivot shaft or pin 18. The pedal arm 14 is preferably formed from a steel or plastic material. The housing 16 houses an electronic throttle control sensor 20 and a hysteresis assembly 22. Preferably the housing 16 is light weight and made from a nylon or plastic material.

The electronic throttle control sensor 20 is supported by the housing 16 and generates an electric control signal that varies in magnitude in proportion to the extent of movement of the pedal arm 14 relative to the housing 16. The use of an electronic throttle control sensor 20 eliminates the need for mechanical linkages and cables to control a vehicle engine.

The hysteresis assembly 22 preferably includes a pair of coil springs 24 and a pedal pivot arm 26. While two (2) coil springs 24 are preferred, it should be understood that more or less than two (2) coil springs 24 could be used. The pivot arm 26 includes a pivot hole 28 through which the pivot pin 18 for the accelerator pedal arm 14 is inserted for pivotally attaching the pedal arm 14 and pivot arm 26 to the housing 16. The housing 16 includes a pair of cylindrical boot or collar portions 30 formed by the housing side walls for receiving and housing the respective pair of coil springs 24. Each collar portion 30 includes a notch portion 32 extending through the side wall of the housing 16. Each spring 24 includes a first distal end 34 received and retained in the respective notch portion 32 of the collar portion 30 and a second distal end 36 engaged with the pivot arm 26. The pivot arm 26 includes a pair of cam lobes 38 which interact and engage the second distal ends 36 of the coil springs 24. The cam lobes 38 are spaced apart and vary in height and include a rounded peak for smooth interference with the second distal ends 36 of the springs 24. Each cam lobe 38 may also include a cap 40 which may by made of nylon or other low frictional resistive material to reduce the frictional wear between the cam lobes 38 and second distal ends 36.

In operation, when the accelerator pedal 12 is actuated or pressed downwardly, the cam lobes 38 of the pivot arm 26 rotate against the spring bias force of the second distal ends 36 of the coil springs 24. The first distal ends 34 are retained in the notches 32 in the housing 16, thus causing the springs 24 to coil more tightly as well as being forced against the side wall of the collar portions 30 in the housing 16. Once the driver has exerted an initial force on the accelerator pedal 12 to achieve a desired speed, the frictional effect of the springs 24 reacting against the side wall of the collar portions 30 of the housing 16 decreases the force required to maintain the pedal 12 in that position, thus achieving a hysteresis effect.

Figure 1:
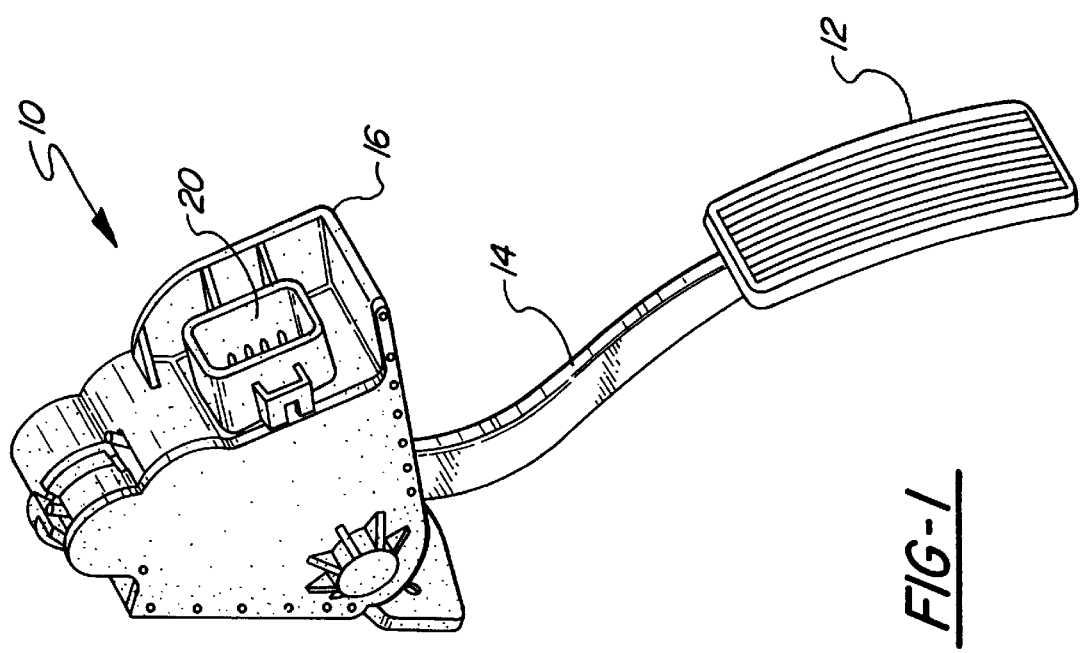
FIG. 1 is a perspective view of the subject invention with the electronic throttle control mounted in a housing of an accelerator pedal assembly.

FIGS. 1 and 2 disclose the one embodiment of the subject invention wherein the housing 16 is generally pie-shaped for receiving a self-contained type electronic throttle control sensor as shown at 20. FIG. 3 discloses an alternative embodiment of the subject invention wherein the housing 16 is smaller in dimension and the electronic throttle control sensor 20 is incorporated integrally into the housing 16 as a built-in component to provide a lower profile design. This is discussed in further detail in the co-pending application having Ser. No. 08/314,981, filed on May 18, 1999, assigned to the same assignee as the subject application and herein incorporated by reference.

FIG. 4 discloses the nylon or plastic cap 40 seated on the cam lobes 38 for interacting with the second distal ends 36 of the springs 24 to reduce the frictional wear therebetween. The cap 40 includes a slots or grooves 42 in the center thereof for retaining the second distal end 36 on the cam lobe 38. Each lobe 38 can be covered by a separate cap 40, or a cap 40 can be formed as a single piece to simultaneously cover both lobes 38.

Figure 6:
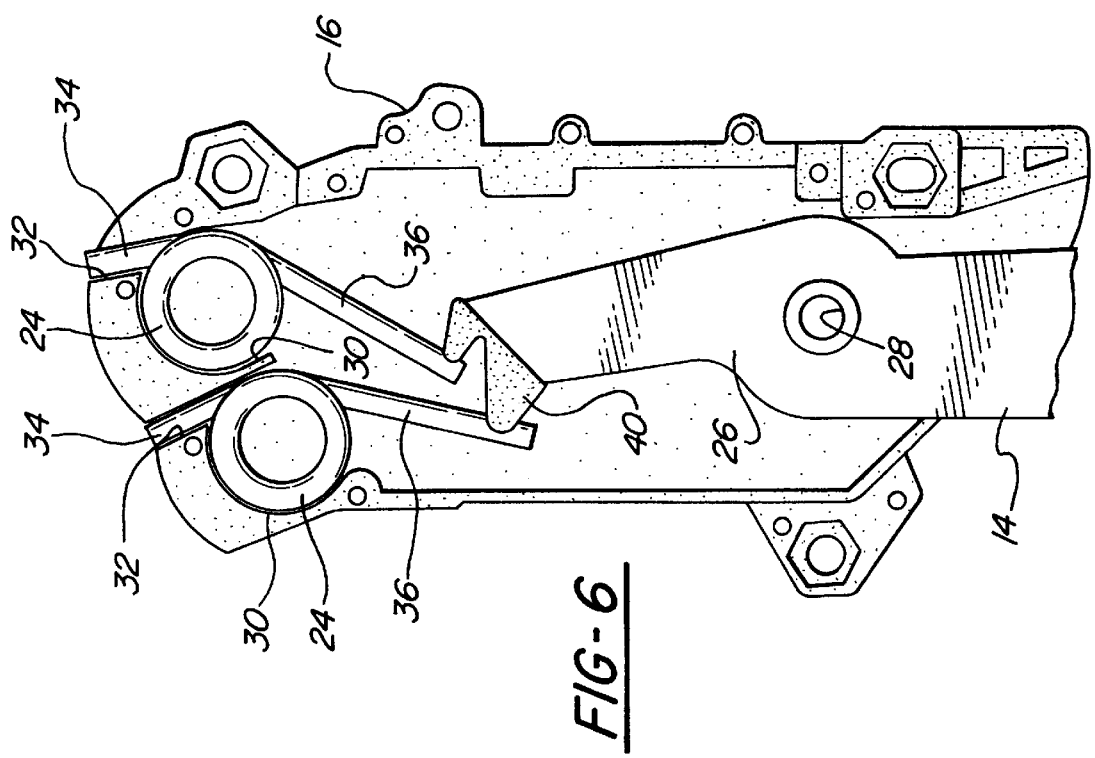
FIG. 6 is a partially broken top view of the pedal housing of FIG. 3 with the cover removed and the pedal in the actuated position.
Figure 5:
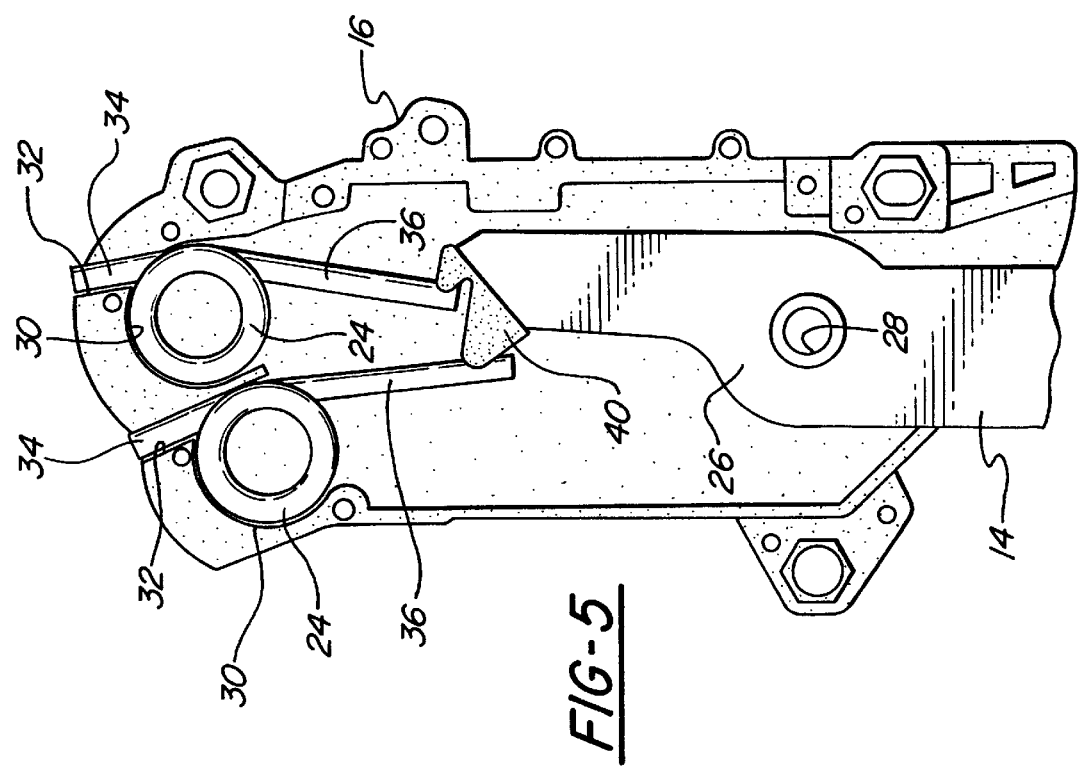
FIG. 5 is a partially broken top view of the pedal housing of FIG. 3 with the cover removed and the pedal in the rest position.
Figure 8:
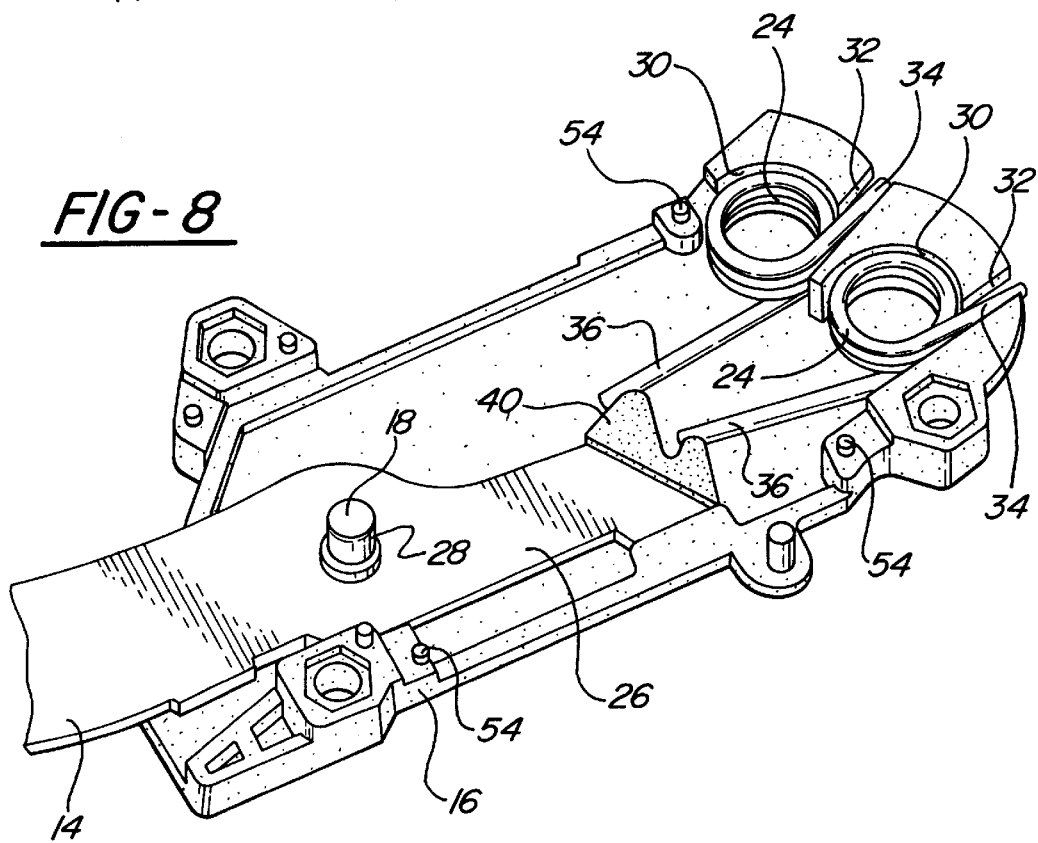
FIG. 8 is a partially broken perspective view of the pedal housing with the cover removed of FIG. 5.

FIGS. 5 and 8 show the coil springs 24 positioned in the housing collars 30 and the pedal arm 26 in the rest or inoperative position and FIG. 6 shows the pedal 26 in the actuated position with the coil springs 24 flexed into tension against the biasing force of the coil springs 24 on the cam lobes 38 and the springs 24 pressed into frictional contact with the side wall of the housing collars 30 to cause the hysteresis effect on the force required to retain the pedal 26 in the actuated position.

Figure 7:
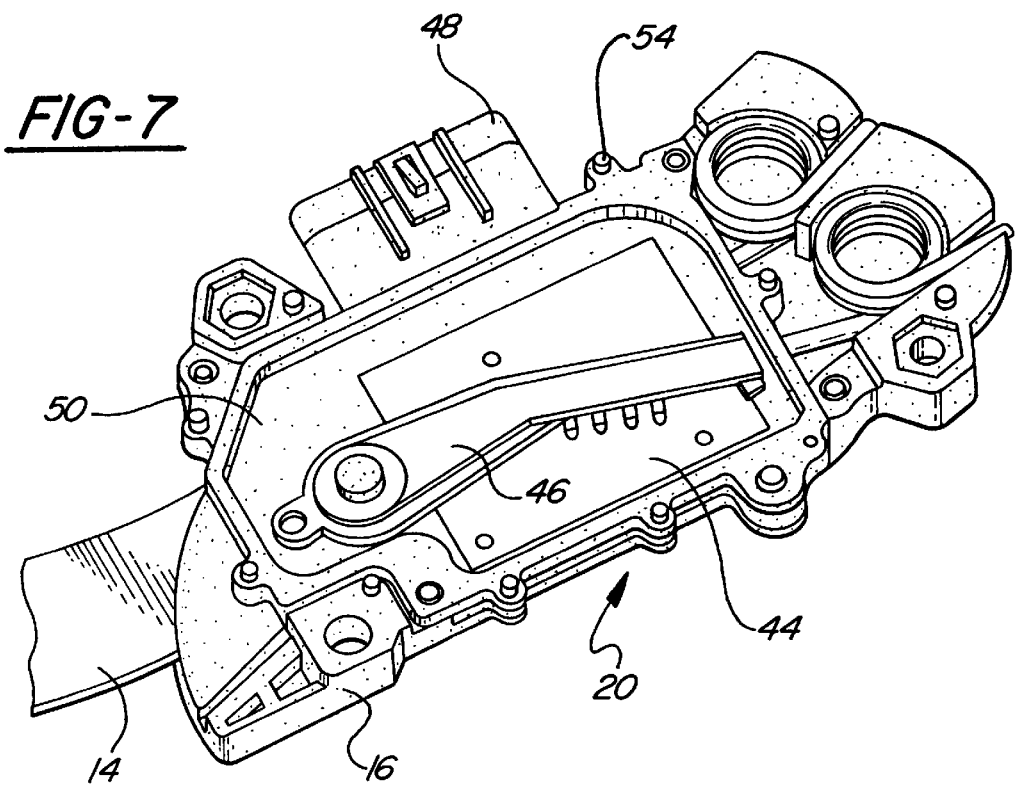
FIG. 7 is a partially broken perspective view of the pedal housing with the cover removed showing the electronic throttle control.

FIG. 7 discloses the integral electronic throttle control sensor 20 incorporated into the housing 16 having a sensor pad 44 and contact rotor or sensor arm 46 to send an electronic signal from the outlet 48 to the throttle body (not shown).

As shown in FIG. 7, the housing 16 includes a center partition 50 mounted within the housing 16. The partition 50 separates the sensor arm 46 from the coil spring 24. The sensor arm 46 is mounted on the pivot shaft 18 on which the pedal arm 14 pivots.

The housing 16 also includes a cover 52 that attaches to the housing 16 to provide a sealed environment for the sensor arm 46 and pad 44. The arm 46 and pad 44 should be free of dirt and other contaminants in order to work efficiently. The cover 52 keeps the dirt from interfering in the operation of the sensor arm 46 as it wipes against the pad 44. As discussed above, the housing 16 and cover 52 are preferably light weight and are made from a nylon or plastic material.

The housing 20 preferably includes a plurality of tabs 54 spaced around a circumferential lip of the housing 16. The tabs 54 are inserted into corresponding openings in the cover 52 and are heat staked to fasten the housing 16 and cover 52 together. It should be understood, however, that other fastening methods known in the art could also be used to connect the housing 15 to the cover 52.

An epoxy sealer is also preferably placed applied between the cover 52 housing 16 for sealing purposes. Other sealing methods known in the art can also be used. O-rings (not shown) are used to seal the pivot shaft 18 within the housing 16 and cover 52.

While an accelerator pedal has been described in the preferred embodiment above, it should be understood that the inventive hysteresis assembly could also be used in other pedal applications. For example, in a drive-by-wire vehicle with an electronic throttle control and electronic braking, the hysteresis assembly could be used to provide feel and feedback for a brake pedal.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A pedal assembly including:

a housing (16) having a first curved recess (30);

a pedal arm (14) pivotally connected to said housing (16) and having a first end supporting a pedal pad (12) and a second end forming a pedal pivot arm (26), said pedal pivot arm (26) having at least one engagement portion extending therefrom;

a first resilient member (24) partially received in said first curved recess (30) and having an outer surface, said first resilient member (24) having a first distal end (34) seated in said housing (16) and a second distal end (36) in bias contact with said engagement portion wherein said outer surface of said first resilient member (24) is forced into frictional contact with a portion of said first curved recess (30) when said pedal arm (14) is pivoted from a rest position to an operative position to reduce the spring force of the resilient member (24) on said pedal arm (14).

2. An assembly as set forth in claim 1 wherein said engagement portion is a cam lobe (38) with a groove (42) for receiving said second distal end (36) of said resilient member (24).

3. An assembly as set forth in claim 1 wherein said housing (16) includes a notch (32) extending tangentially to said curved recess (30) for seating said first distal end (34) of said resilient member (24).

4. A pedal assembly including:

a housing (16) having a first curved recess (30);

a pedal arm (14) pivotally connected to said housing (16) and having a first end supporting a pedal pad (12) and a second end forming a pedal pivot arm (26), said pedal pivot arm (26) having at least one engagement portion extending therefrom;

a first resilient member (24) partially received in said first curved recess (30), said first resilient member (24) having a first distal end (34) seated in said housing (16) and a second distal end (36) in bias contact with said engagement portion; and a second resilient member (24) partially received in a second curved recess (30) of said housing (16), said second resilient member (24) having a first distal end (34) seated in said housing (16) and a second distal end (36) in bias contact with said engagement portion wherein said first and second resilient members (24) are simultaneously forced into frictional contact with a portion of said first and second curved recesses (30) when said pedal arm (14) is pivoted from the rest position to the operative position to reduce the spring force of said resilient members (24) on said pedal arm (14).

5. An assembly as set forth in claim 4 wherein said engagement portion is comprised of a first cam lobe (38) and a second cam lobe (38), said first cam lobe (38) interacting with said second distal end (36) of said first resilient member (24) and said second cam lobe (38) interacting with said second distal end (36) of said second resilient member (24) when said pedal arm (14) is pivoted from the rest position to the operative position.

6. An assembly as set forth in claim 4 including a cap (40) mounted to said pedal pivot arm (26) to form said engagement portion.

7. An assembly as set forth in claim 6 wherein said cap (40) is formed as a single piece.

8. An assembly as set forth in claim 7 wherein said cap (40) includes a first groove (42) for receiving said second distal end (36) of said first resilient member (24) and a second groove (42) for receiving said second distal end (36) of said second resilient member (24).

9. An assembly as set forth in claim 5 wherein said housing (16) includes a first notch (32) extending tangentially to said first curved recess (30) for seating said first distal end (34) of said first resilient member (24) and a second notch (32) extending tangentially to said second curved recess (30) for seating said first distal end (34) of said second resilient member (24).

10. An assembly as set forth in claim 9 wherein first and second notches (32) extend through a side wall of said housing (16).

11. An assembly as set forth in claim 1 including an electronic throttle control sensor (20) supported by said housing (16), said electronic throttle control sensor (20) for generating an electric control signal that varies in magnitude in proportion to the extent of movement of said pedal arm (14) relative to said housing (16).

12. An assembly as set forth in claim 1 wherein said pedal arm is an accelerator pedal arm (14) for an electronic throttle control, said accelerator pedal arm (14) being pivotally supported on a shaft (18) to define a pivot axis and including a sensor member (46) pivotally mounted on said shaft (18) for pivotal movement with said pedal arm (14) about said pivot axis and wherein said housing (16) presents a sensing surface (44) for interacting with said sensor member (46) to generate an electric control signal that varies in magnitude in proportion to the extent of movement of said pedal arm (14) relative to said housing (16).

13. A pedal assembly including:

a housing (16);

a pedal arm (14) pivotally connected to said housing (16) and having a first end supporting a pedal pad (12) and a second end forming a pedal pivot arm (26);

said pedal pivot arm (26) having at least one cam lobe (38) extending therefrom;

said housing (16) having a cylindrical collar portion (30) recessed in said housing (16), said collar portion receiving and retaining a coil spring (24) having a curved outer surface, said collar portion (30) having a notch (32) extending through a side wall of said collar portion (30);

said coil spring (24) having a first distal end (34) seated in said notch (32) and a second distal end (36) in bias contact with said cam lobe (38) wherein said outer surface of said coil spring (24) is forced into frictional contact with said side wall of said collar portion (30) when said pedal arm (14) is pivoted from a rest position to an operative position to reduce the spring force of the coil spring (24) on the pedal arm (14).

14. An assembly as set forth in claim 13 including a cap (40) at least partially covering said cam lobe (38) to provide an engagement surface for interacting with said second distal end (36) of said coil spring (24).

15. An assembly as set forth in claim 14 wherein said cap (40) includes a groove (42) extending along said engagement surface for retaining said second distal end (26) of said spring (24).

16. A pedal assembly including:

a housing (16);

a pedal arm (14) pivotally connected to said housing (16) and having a first end supporting a pedal pad (12) and a second end forming a pedal pivot arm (26);

said pedal pivot arm (26) having at least one cam lobe (38) extending therefrom;

said housing (16) having a first cylindrical collar portion (30) recessed in said housing (16), said first cylindrical housing portion receiving and retaining a first coil spring (24), said first collar portion (30) having a notch (32) extending through a side wall of said first collar portion (30), said first coil spring (24) having a first distal end (34) seated in said notch (32) and a second distal end (36) in bias contact with said cam lobe (38); and said housing (16) having a second cylindrical collar portion (30) recessed in said housing (16), said second cylindrical collar portion receiving and retaining a second coil spring (24), said first and second coil springs (24) frictionally engaging side walls of first and second collar portions (30) when said pedal arm (14) is pivoted from the rest position to the applied position to reduce the spring force of the coil springs (24) on said pedal arm (14).

17. An assembly as set forth in claim 16 wherein said at least one cam lobe (38) is comprised of a first cam lobe and a second cam lobe, said second cam lobe for interacting with said second coil spring (24).

18. An assembly as set forth in claim 13 including an electronic throttle control sensor (20) supported by said housing (16), said electronic throttle control sensor (20) for generating an electric control signal that varies in magnitude in proportion to the extent of movement of said pedal arm (14) relative to said housing (16).

19. An assembly as set forth in claim 18 wherein said electronic throttle control sensor (20) includes a sensor arm (46) mounted for pivotal movement with said pedal arm (14) about a common pivot shaft (18).

20. An assembly as set forth in claim 19 including a center partition (50) mounted within said housing (16) and separating said sensor arm (46) from said coil spring (24).

* * * * *